United States Patent [19]

Grant et al.

[11] Patent Number: 4,690,552

[45] Date of Patent: Sep. 1, 1987

[54] OPTICAL METHOD AND APPARATUS FOR STRAIN ANALYSIS

[75] Inventors: Ralph M. Grant; Richard E. Haskell; Anthony Paskus, all of Rochester; Stanley R. Windeler, Bloomfield Hills; Forrest S. Wright, Rochester, all of Mich.

[73] Assignee: Industrial Holographics, Inc., Auburn Heights, Mich.

[21] Appl. No.: 766,927

[22] Filed: Aug. 19, 1985

[51] Int. Cl.[4] .......................... G01B 9/02; G01B 11/16
[52] U.S. Cl. .................................... 356/35.5; 356/353; 356/354
[58] Field of Search ...................... 356/35.5, 353, 354, 356/355, 356

[56] References Cited

PUBLICATIONS

Hariharan et al., "Double Grating Interferometer ...", Optics Communications, vol. 11, No. 3, pp. 317–320, 7/74.

Hariharan, "Speckle-Shearing Interferometry ...", Applied Optics, vol. 14, No. 11, p. 2563, 11/75.

Koliopoulos, "Radial Grating Lateral Shear ...", Applied Optics, vol. 19, No. 9, pp. 1523–1528, 5/80.

Hung, "Shearography: A New Optical Method ...", Optical Engineering, vol. 21, No. 3, pp. 391–395, 6/82.

Primary Examiner—Davis L. Willis
Assistant Examiner—Matthew W. Koren
Attorney, Agent, or Firm—Krass & Young

[57] ABSTRACT

A method and apparatus for measuring strains in a test object in any of a plurality of directions. The object is illuminated with coherent light so that light is reflected to a focussing lens and a shearing diffraction grating having lines extending in a plurality of directions. The various diffracted orders interfere at the focal plane of the lens and are recorded on a photographic media. The object is then stressed and a second exposure is made on the same media, resulting in interference between the fringes produced on the two exposures. The media is developed as a transparency and subjected to optical processing to detect strain in any direction.

7 Claims, 6 Drawing Figures

OPTICAL METHOD AND APPARATUS FOR STRAIN ANALYSIS

FIELD OF THE INVENTION

This invention relates to a method and apparatus for analyzing strains in an object and, more particularly, to light interferometry method and apparatus for analyzing strains in an object in any of a plurality of directions.

DESCRIPTION OF THE PRIOR ART

It is important in many commercial settings to be able to test an object for strains which occur when the object is stressed. Such techniques detect subsurface defects, can predict premature failure and improve and maintain product reliability and quality. Examples of manufactured products which are tested in these ways are automotive and truck tires, objects subjected to internal pressures such as pressure vessels and metal and plastic castings, and laminated panels such as aircraft wings.

One technique for performing such testing is holographic interferometry. With such a technique, an object is illuminated with coherent light and the interference pattern creates between light reflected from the object and a refering beam of coherent light is recorded on a photographic media. The object is then stressed, as by changing the ambient pressure or temperature and the resulting interference pattern is recorded as a second exposure on the photographic media. When the media is developed to form a hologram, and the hologram is illuminated with an appropriate reconstructing light beam, an image of the illuminated object is reconstructed having superimposed fringe lines which result from the interference between the two interference patterns created during the two exposures, and represent contours of equal displacement of the object surface between the exposures. These fringes make the existence of undesirable strains immediately obvious. Holographic interferometry, however, loses much of its usefulness in the presence of even the slightest movement of the whole test object between the unstressed and stressed conditions. Under industrial conditions, such movement of the object to be tested may be unavoidable. Additionally, fringes are present in the reconstructed image resulting from non-anomolous overall strain of the object and changes in the index of refraction of the media between exposures, making it difficult to interpret the meaningful fringes.

Another technique for analyzing strains in an object is shearography. This technique relies upon the simultaneous production of two focussed images of the test object under both unstressed and stressed conditions. As disclosed in U.S. Pat. No. 4,139,302, to Hung and Grant, assigned to the assignee of this patent application, the two images may be created by a single camera by providing a wedge over one-half of the camera lens. Half of the light scattered from any point on the object being tested is focussed at one place in the image plane while the other half of the light scattered from that point on the object is focussed at another place in the image plane. The result is that the light scattered by all points on the test object creates an interferogram. When two interferograms formed of the object in two states of stress are caused to interfere with one another, for example, by exposing the same photographic emulsion to both interferograms, the result is an interference pattern (or "shearogram") containing fringes denoting contours of constant spatial rate of change of surface deformation. Because the fringes have a constant optical intensity over the shearogram, it may be necessary to perform coherent optical processing of the shearogram to filter out the higher orders of interference and to render the fringes visible. Shearography typically solves the difficulties associated with strain analysis testing under industrial conditions, because the results are not affected by whole body translations of the test object.

The use of a wedge on the camera lens shears the image in only one direction. Therefore, strains may only be detected parallel to the direction of displacement of the sheared images. A two wedge camera lens as disclosed by Y. Y. Hung and A. J. Durelli in "Simultaneous Measurement of Three Displacement Derivatives Using a Multiple Image-Shearing Interferometric Camera", Journal of Strain Analysis, volume 14, no. 3, pages 81–88, 1979, permits the detection of strains in two chosen directions and in the direction bisecting the angle between these two directions. In the coherent processing step the image may be spatially filtered to evidence strains in one of the three directions to the exclusion of the other two directions. Furthermore, by appropriate placement of photographic stops in the aperture of the Fourier transformation plane created during processing, selected rates of spatial derivatives may be detected. This method is disclosed by Y. Y. Hung, et al. in "Full-Field Optical Strain Measurement Having Postrecording Sensitivity and Direction Selectivity", in Experimental Mechanics, volume 18, no. 2, pages 56–60, February 1978.

A more complete and better understanding of the strains induced in the test object by given stress conditions is possible when the strains may be detected in any of a large number of possible directions rather than only a limited few. Consequently, a need exists for improvements in shearographic techniques which will permit the analysis of strains oriented in a large number of directions from a single shearographic image.

SUMMARY OF THE INVENTION

The present invention provides a method and apparatus which satisfies the aforementioned needs. According to one aspect of the invention, a shearographic apparatus is provided wherein the focussing/shearing optical element in the imaging camera comprises a focussing optical element, typically a lens, and a diffraction grating covering the focussing optical element, with its lines arranged in a plurality of directions. The grating produces multiple images of the object displaced from one another which interfere to form a first interferogram on a photographic plate. When the object is stressed a second interferogram is formed and the two interferograms interfere with each other to form a shearogram. The shearogram can be optically transformed and filtered in the Fourier image plane to permit imaging of only those strains occurring in a given desired direction. The same result may be obtained by storing the interferograms resulting before and after the application of stress conditions in a computer memory, and programming a computer to perform the filtering in the desired directions. The diffraction grating may have straight lines running in two orthogonal directions, radial lines emanating from a common center, or circumferential lines created by concentric circles. The focussing/shearing optical element can be created in the form of a holographic optical element.

BRIEF DESCRIPTION OF THE DRAWINGS

Other objects, advantages and applications of the present invention are disclosed in the following detailed description of several preferred embodiments of the invention. The description makes reference to the accompanying drawings in which.

DETAILED DESCRIPTION OF THE PREFERRED EMBODIMENT

Figure 1:
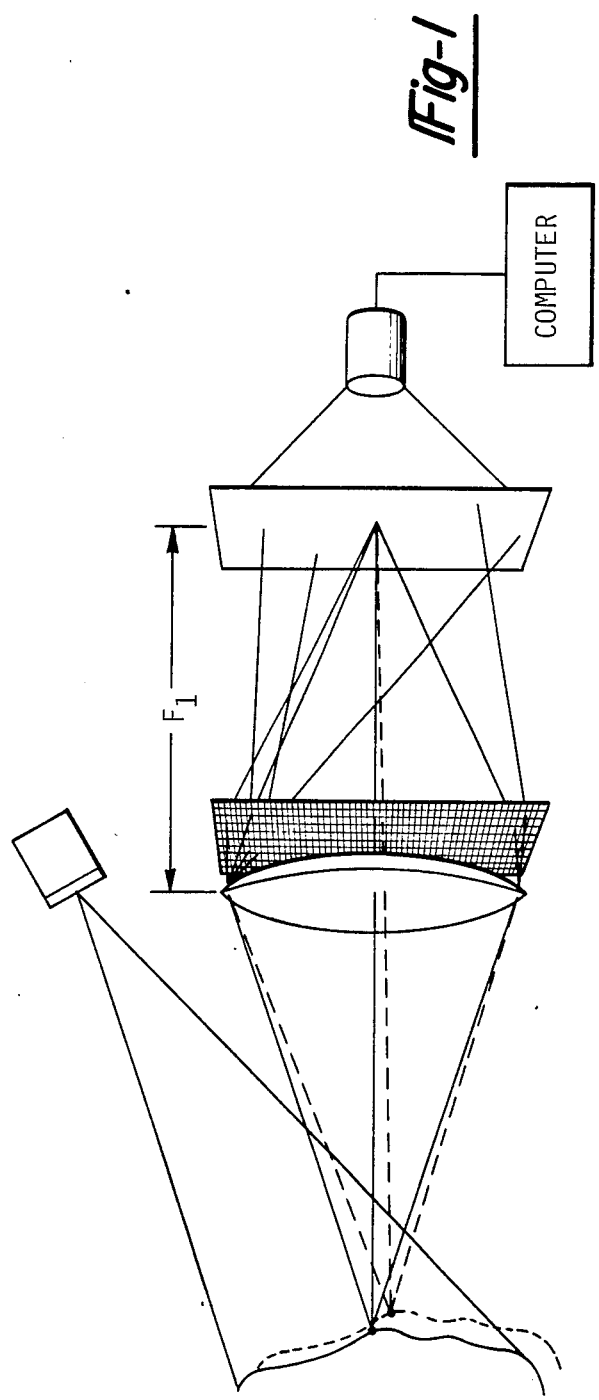
FIG. 1 is a schematic view of apparatus for the creation of a shearographic image according to the present invention.

In a preferred embodiment of the apparatus of the present invention shown in FIG. 1, the apparatus 10 is shown to consist of a source of coherent light 12, such as a laser, a focussing lens 14 having a focal length F, a diffraction grating 16, and a photographic emulsion 18 placed in the focal plane of lens 14, a distance $F_2$ behind focussing lens 14. Apparatus 10 is used to perform a strain analysis on object 20.

A lens 24 transforms the coherent light produced by light source 12 to a diverging wavefront 22 which illuminates a section of the surface of object 20. The surface of object 20 is denoted in its relaxed condition by solid line 26 and in its stressed condition by dashed line 28.

The light scattered by point $P_1$ (denoted by 30) on the surface 26 of the relaxed test object 20 is focussed by lens 14 to the focal plane 32. This light is also sheared by diffraction grating 16 before reaching photographic emulsion 18 in imaging plane 32. Each light ray striking grating 16 is split into a plurality of rays which eventually reach plane 32. The actual number of rays created by grating 16 depends upon the type of diffraction grating used. However, for each ray deviated by a given angle from its direction of travel (positive order), there is another ray deviated by a negative angle from that same direction of travel (negative order). The shearing accomplished by diffraction grating 16 may be performed either before or after the light passes through imaging lens 14. Because of the configuration of lens 14 and diffraction grating 16, the light scattered from point $P_1$ (denoted by 30) on the relaxed test object surface is focussed to a plurality of points 34 lying in image plane 32, including point I (denoted by 34'). The shearing performed by diffraction grating 16 causes a plurality of laterally translated focussed images in plane 32, which combine to create fringes in plane 32.

When the object 20 is stressed, all of the light being focussed at point I (34') in image plane 32 emanates from other points on the stressed surface 28 of test object 20. One such point, $P_2$, is denoted by the numeral 36. Points $P_1$ and $P_2$ are not necessarily the same point. The light from point $P_2$ (36) is also sheared to additional points (not shown) in plane 32.

Depending upon the relative path lengths transversed by the light scattered to point 34', the wavefronts creating the fringes in photographic emulsion 18 in image plane 32 can range from being completely in phase to completely out of phase. This will result in fringes ranging from dark to light, depending upon whether the interference at point 34' is constructive, destructive or some intermediate level.

Diffraction grating 16 shown in FIG. 1, consists of two families of parallel straight lines orthogonal to one another and will therefore create shearing of the image in two orthogonal directions. The interference fringes created in photographic plate 18 after the photographic emulsion has been developed can be analyzed to determine the strain created in either of these two orthogonal directions. The apparatus for accomplishing this directional operation will be subsequently described.

Figure 2C:
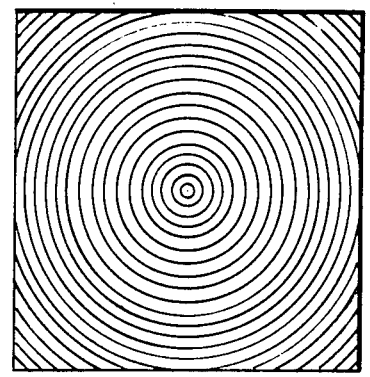
FIGS. 2(A-C) illustrate three alternative diffraction gratings for use with the apparatus of the present invention.
Figure 2B:
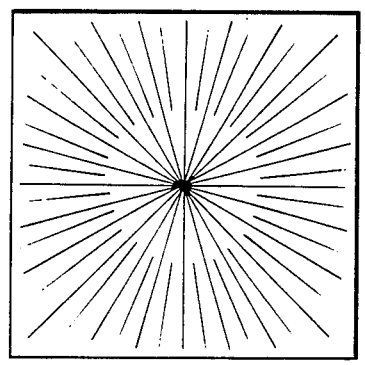
Figure 2A:
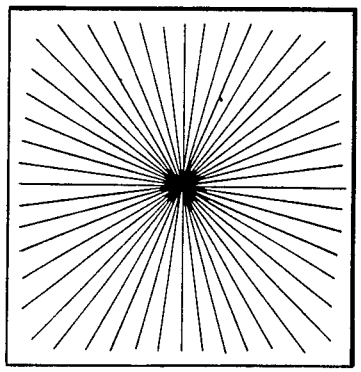

Diffraction grating 16 may take any of a variety of forms. A few of the possible forms are shown in FIGS. 2A-C. FIG. 2A shows diffraction grating 16 in the form of a series of radial lines 38 emananting from a common center 40. It is apparent that these radial lines define a large number of directions, permitting the image recorded in emulsion 18 of FIG. 1 to be sheared in the large number of directions perpendicular to these radial lines.

The radial line configuration such as that shown in FIG. 2A has variable spacing ranging from very small spacing between lines 38 near center point 40 to relatively large spacing near the edges of diffraction grating 16. This may undesirably affect the quality of the image by permitting the detection of an unacceptably wide range of strain levels. A grating creating more nearly uniform radial line spacing is shown in FIG. 2B. Here, diffraction grating 16 contains a first set of radial lines 38 emanating from a center point 40 as in FIG. 2A, supplemented by another set of radial lines 42 which do not reach to the central point 40, but rather extend only in the outer portions of diffraction grating 16, say only the outer half of the distances defined by the rays 38 emanating from center 40.

Yet another configuration for diffraction grating 16 is shown in FIG. 2C. A family of concentric circular lines 44 centered upon point 40 and having uniform spacing creates a highly uniform family of lines capable of shearing the image in all directions.

The diffraction gratings 16 shown in FIGS. 1 and 2 can be created holographically and may constitute either amplitude or phase diffraction gratings. The amplitude diffraction gratings will contain alternating lines of transmissivity ranging from 0% (dark lines) to 100% (transparent lines). Holographic techniques can also be used to create phase holograms, by bleaching the dark lines to leave only nonuniformities in the holographic emulsion, thereby creating nonuniformities in the emulsion's index of refraction.

Alternatively, phase diffraction gratings can be created by the ruling of very fine lines on a plate such as a glass plate. The diffraction gratings can be either square wave gratings, where very abrupt changes in dark to light or in index of refraction are created, or sinusoidal diffraction gratings, wherein the intensity of the lines or the index of refraction varies sinusoidally throughout the holographic emulsion. For this application, sinusoidal diffraction gratings are to be preferred because they introduce fewer higher order frequencies into the resulting shearographic image. Phase diffraction gratings have the further advantage in this application of suppressing the zero order diffraction, splitting the impinging wavefront equally into +1 or −1 orders if the diffraction grating is sinusoidal. Suppression of the zero order diffraction can be important for use with some forms of the apparatus.

Figure 3:
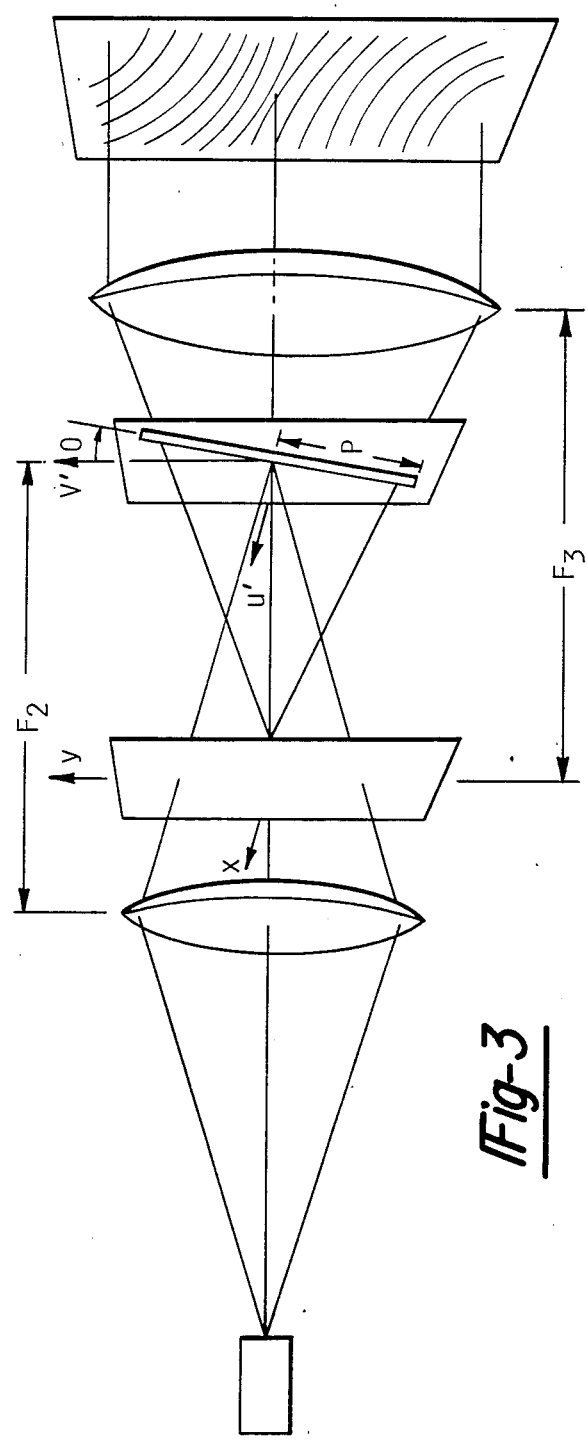
FIG. 3 shows a playback apparatus for use with the shearographic images created by the apparatus of the present invention.

FIG. 3 of the drawings shows a form of playback apparatus for displaying spatially filtered shearographic images, thereby allowing analysis of strains in desired directions. Emulsion 18 is placed in the imaging plane of imaging lens 46 located the focal distance $F_3$ away from lens 46, thereby creating an image in image plane 48 such as a plate of ground glass. A spherical wavefront 52 is created by light source 50, the wavefront impinging on transforming lens 54. Lens 54 produces a converging wavefront 56 which focusses at Fourier plane 58 located the focal distance $F_2$ away from lens 54. The converging wavefront 56 created by transforming lens 54 passes through emulsion 18. Therefore, the image created at Fourier transform plane 58 is the Fourier transform of the image contained in emulsion 18. That fact permits the spatial and directional filtering of the shearographic images contained in emulsion 18. As illustrated in FIG. 3, a mask containing a thin slit 60, centered about the system's optical axis 62, permits light at plane 58 to pass through imaging lens 46 and thence to imaging plane 48.

Through proper choice of the length, extent, and angular orientation of slit 60, a range of strain directions, a range of strained magnitudes and a particular direction of strains may be chosen for presentation. For example, to block low frequencies which may exist in the image contained in emulsion 18, a circular stop, centered on optical axis 62 may be used. On the other hand, if there is no interest in strain levels greater than a predetermined amount, slot 60 may be limited to prevent the higher frequencies in Fourier plane 58 representing these higher strain levels from passing through imaging lens 46 to image plane 48. It will be clear to one skilled in the art that the image presented at image plane 48 may be interpreted by a human operator, by orientation of slit 60 to find features of interest.

Figure 4:
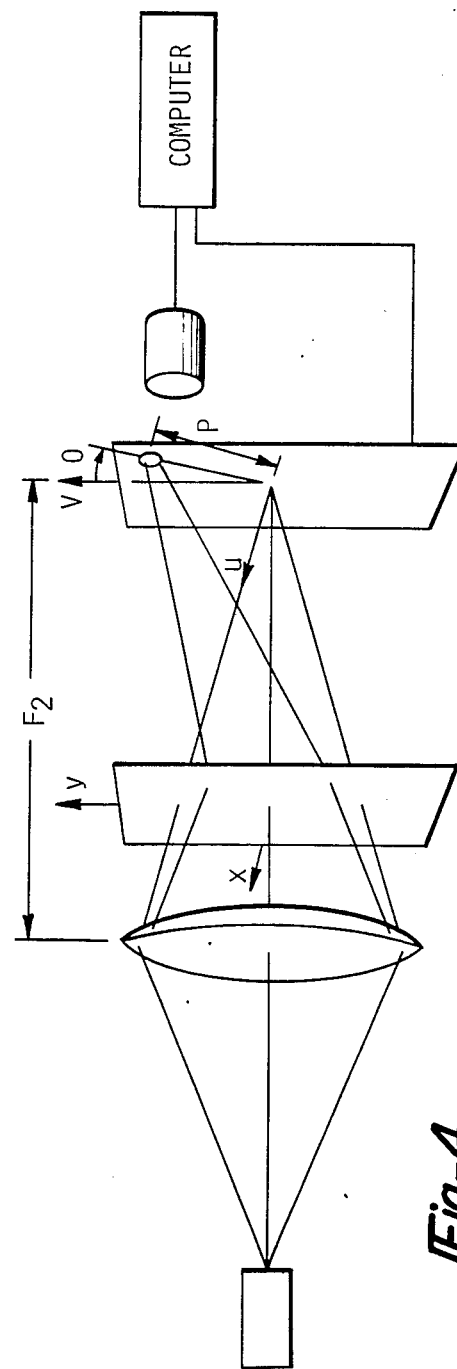
FIG. 4 shows an alternative playback apparatus utilizing optical serving of a transformed image and a computer for analysis.

An alternative approach 3 shown in FIG. 4 of the drawings. Features common to FIGS. 3 and 4 are numbered identically. As explained in connection with FIG. 3, a Fourier transform of the image contained in emulsion 18 is produced at Fourier image plane 58, located the focal distance $F_2$ of lens 54 from lens 54. At plane 58 in FIG. 4, an optical stop having a single hole 64 transmits the light representing a direction represented by angle $\phi$ and the spatial frequency represented by the distance $\rho$ to an optical imaging device 66, such as a vidicon tube. The signals measuring the transmitted light intensity passing through hole 64 are sent to computer 68. As shown symbolically, computer 68 can control the position of hole 64 by sending appropriate signals over line 70 to a control mechanism located at plane 58.

As a further alternative, the interferograms created in plane 32 of FIG. 1 may be optically sampled by imaging device 72 which scans the image created on a glass plate (not shown) substituted for emulsion 18 in plane 32, both before and after the imposition of deforming forces upon test object 20. These images can be sent to computer 74 where they are digitized, stored separately in computer memories, and added to create a resulting interference pattern. The interference pattern is then analyzed by a properly programmed computer 74 to perform the spatial and directional filtering accomplished optically in Fourier plane 58 of the apparatus shom in FIG. 3. If the images presented in plane 32 shown in FIG. 1 are to be optically sensed, one skilled in the art will appreciate that nonlinear processing of the interferogram images, such as might be accomplished by a properly programmed computer can be used advantageously to improve the contrast of the images in plane 32. The use of phase diffraction gratings when optically sampling the interferograms created in plane 32 of FIG. 1 provides improved results because the on-axis nature of the optical sampling is not complicated by the presence of zero order diffractions created by amplitude diffraction gratings.

While the foregoing is intended to present preferred embodiments of the subject invention, the scope of this invention is to be limited only by the following claims.

We claim:

1. In an apparatus for detecting strains in an object resulting from the application of deformation forces, including means for illuminating the object with coherent light, a focussing/shearing optical element operative to receive the coherent light reflected by the object and to generate a plurality of interferring focussed images of the object each shifted laterally with respect to the others, means for recording a first interferogram resulting from the interference of the plurality of focussed images, means for imposing a deforming force to the object, and means for recording a second interferogram resulting from the interference of the plurality of focussed images of the object which result after imposing the deforming force, the improvement wherein the focussing/shearing optical element comprises a focussing optical element and a phase diffraction grating having lines arranged in a plurality of directions including a first plurality of lines extending radially from a common point and a second plurality of lines oriented in radial directions from the common point whose distance from the common point exceed a predetermined distance supported relative to the focussing optical element so that the coherent light reflected by the object passes through both the focussing optical element and the diffraction grating, whereby the interferograms can be analyzed to detect strain in any of the plurality of directions perpendicular to the diffraction grating lines.

2. The apparatus of claim 1 further comprising means for superimposing the two recorded interferograms and means for analyzing the interference pattern resulting from superimposing the two interferograms.

3. In an apparatus for detecting strains in an object resulting from the application of deformation forces, including means for illuminating the object with coherent light, a focussing/shearing optical element operative to receive the coherent light reflected by the object and to generate a plurality of interferring focussed images of the object each shifted laterally with respect to the others, means for recording a first interferogram resulting from the interference of the plurality of focussed images, means for imposing a deforming force to the object, and means for recording a second interferogram resulting from the interference of the plurality of focussed images of the object which result after imposing the deforming force, the improvement wherein the focussing/shearing optical element comprises a focussing optical element and a diffraction phase grating having lines arranged in a plurality of directions forming a plurality of concentric circles supported relative to the focussing optical element so that the coherent light reflected by the object passes through both the focussing optical element and the diffraction grating, whereby the interferograms can be analyzed to detect strain in any of the plurality of directions perpendicular to the diffraction grating lines.

4. The apparatus of claim 3, further comprising means for superimposing the two record interferograms and means for analyzing the interference pattern resulting from superimposing the two interferograms.

5. In an apparatus for detecting strains in an object resulting from the application of deformation forces, including means for illuminating the object with coherent light, a focussing/shearing optical element operative to receive the coherent light reflected by the object and to generate a plurality of interferring focussed images of the object each shifted laterally with respect to the others, means for recording a first interferogram resulting from the interference of the plurality of focussed images, means for imposing a deforming force to the object, and means for recording a second interferogram resulting from the interference of the plurality of focussed images of the object which result after imposing the deforming force, the improvement wherein:

the focussing/shearing optical element comprises a focussing optical element and a diffraction grating having lines arranged in a plurality of directions forming supported relative to the focussing optical element so that the coherent light reflected by the object passes through both the focussing optical element and the diffraction grating, said apparatus further comprising the means for recording each of the interferograms including
optical sensor means for producing a signal measuring the amplitude of each interferogram at predetermined points in the interferogram,
means for converting the signal to digital values, digital memory means, and
means for storing the digital values in the digital memory means in a predetermined sequence;

said means for superimposing the two recorded interferograms comprises:
means for reading the stored digital values representing the two interferograms from the memory means,
means for adding the digital values at corresponding points in the two interferograms, thereby determining the values which represent their interference pattern, digital memory means, and
means for storing the digital values representing the interference pattern resulting from superimposing the two interferograms in a predetermined sequence; and said apparatus further comprising means for analyzing the interference pattern resulting from superimposing the two interferograms including
means for reading the stored digital values representing the interference pattern, and
computer means adapted to receive the digital values representing the interference pattern and programmed to analyze the digital values representing the interference pattern, whereby the interferograms can be analyzed to detect strain in any of the plurality of directions perpendicular to the diffraction grating lines.

6. The apparatus of claim 5, wherein the computer means is programmed to spatially filter the interference pattern in one or more predetermined directions.

7. In an apparatus for detecting strains in an object resulting from the application of deformation forces, including means for illuminating the object with coherent light, a focussing/shearing optical element operative to receive the coherent light reflected by the object and to generate a plurality of interferring focussed images of the object each shifted laterally with respect to the others, means for recording a first interferogram resulting from the interference of the plurality of focussed images, means for imposing a deforming force to the object, and means for recording a second interferogram resulting from the interference of the plurality of focussed images of the object which result after imposing the deforming force, the improvement wherein the focussing/shearing optical element comprises a focussing optical element and a diffraction grating having lines arranged in a plurality of directions supported relative to the focussing optical element so that the coherent light reflected by the object passes through both the focussing optical element and the diffraction grating, said apparatus further comprising means for superimposing the two recorded interferograms including a photosensitive emulsion separately exposed to each of the two interferograms, the resulting interference pattern being photographically fixed by developing the emulsions, means for analyzing the interference pattern including
a point source of light energy creating a spherical wavefront;
transfer lens means for focussing the optical energy in the spherical wavefront at a filtering plane;
means adapted to position the developed photograph emulsion between the transfer lens and the filtering plane substantially perpendicular to an optical axis between the transfer lens and the filtering plane;
optical filtering means, placed at the filter plane and operable to filter preselected spatial frequencies and directions in the interference pattern from the optical wavefront created by illuminating the photographic emulsion with the optical energy focussed by the transfer lens means; and
imaging lens means adapted to transmit the filtered optical wavefront to an output plane;
an optical sensor means for producing a signal at preselected points in the output plane;
means for converting the signal to digital values;
digital memory means;
means for storing the digital values in the digital memory means;
means for reading the stored digital values from the memory means; and
computer means adapted to receive the digital values representing the optical wavefront at the output plane and programmed to analyze the digital values received, whereby the interferograms can be analyzed to detect strain in any of the plurality of directions perpendicular to the diffraction grating lines.

* * * * *